(12) United States Patent
Tezawa

(10) Patent No.: US 10,717,149 B2
(45) Date of Patent: Jul. 21, 2020

(54) CUTTING CUTTER FOR TIP DRESSING, AND TIP DRESSER

(71) Applicant: Kyokutoh Co., Ltd., Nagoya-shi, Aichi (JP)

(72) Inventor: Kazuhiro Tezawa, Nagoya (JP)

(73) Assignee: Kyokutoh Co., Ltd., Nagoya (JP)

(*) Notice: Subject to any disclaimer, the term of this patent is extended or adjusted under 35 U.S.C. 154(b) by 0 days.

(21) Appl. No.: 15/994,856

(22) Filed: May 31, 2018

(65) Prior Publication Data

US 2018/0272458 A1    Sep. 27, 2018

Related U.S. Application Data

(63) Continuation of application No. PCT/JP2015/005968, filed on Dec. 1, 2015.

(51) Int. Cl.
    *B23B 5/16*    (2006.01)
    *B23K 11/30*    (2006.01)
    *B23C 3/12*    (2006.01)

(52) U.S. Cl.
    CPC .......... *B23K 11/3063* (2013.01); *B23B 5/166* (2013.01); *B23B 2224/36* (2013.01); *B23B 2260/072* (2013.01); *B23C 3/12* (2013.01)

(58) Field of Classification Search
    CPC ........ B23K 11/3063; B23B 5/166; B23C 3/12
See application file for complete search history.

(56) References Cited

U.S. PATENT DOCUMENTS

| | | | | |
|---|---|---|---|---|
| 4,436,830 | A | * | 3/1984 | Andreev ............... B23B 27/148 501/96.1 |
| 2008/0078749 | A1 | | 4/2008 | Sigler et al. |
| 2012/0014761 | A1 | | 1/2012 | Fahnenstich |
| 2014/0064863 | A1 | | 3/2014 | Nakajima |
| 2015/0283645 | A1 | | 10/2015 | Moision et al. |

FOREIGN PATENT DOCUMENTS

| | | | |
|---|---|---|---|
| DE | 102012008257 | 10/2013 | |
| DE | 102013001765 B4 | 9/2014 | |
| EP | 0804986 A1 * | 11/1997 | ............. B23B 5/166 |
| EP | 2402110 A1 * | 1/2012 | ............. B23B 5/166 |
| EP | 2982466 | 2/2016 | |
| FR | 2738518 | 3/1997 | |

(Continued)

OTHER PUBLICATIONS

English translation of EP-2402110-A1, Jan. 2012 (Year: 2012).*

(Continued)

*Primary Examiner* — Alan Snyder
(74) *Attorney, Agent, or Firm* — Klarquist Sparkman, LLP

(57) ABSTRACT

The present disclosure reduces equipment failures, decreases maintenance frequency, and stabilizes cutting operation. Specifically, a holder (5) includes a fitting surface (52) capable of fitting a distal end (2*a*) of an electrode tip (2). A cutting member (6) having a cutting blade (6*b*) is attached to the holder (5) and the cutting blade (6*b*) cuts the distal end (2*a*) of the electrode tip (2) by rotating the holder (5). On the fitting surface (52), a plurality of grooves (52*a*) extending arcuately around the rotation axis (C1) as the center thereof are consecutively formed adjacent to each other toward the rotation axis (C1).

7 Claims, 5 Drawing Sheets

(56) References Cited

FOREIGN PATENT DOCUMENTS

JP          2014-176862  A    9/2014
WO    WO 2014/163081  A1  10/2014

OTHER PUBLICATIONS

English translation of EP-0804986-A1, Nov. 1997 (Year: 1997).*
International Search Report and Written Opinion for PCT/JP2015/005968, dated Feb. 16, 2016 by the Japanese Patent Office acting as International Search Authority (in Japanese with an English-language translation of the ISR, 6 pages).
Extended European Search Report for EP Appl. No. 15909671.8, dated Dec. 19, 2018, 6 pages.
Office Action for Canadian Application No, 3,006,710, dated Apr. 2, 2019, 8 pages.
Office Action in corresponding Japanese patent application No. 2017-553473, dated Oct. 29, 2019 (with English translation), 3 pages.
Office Action of corresponding Canadian patent application No. 3,006,710 dated Nov. 21, 2019; 8 pages.
Office Action in corresponding Chinese patent application No. 201580084983.4 dated Dec. 9, 2019; 12 pages (includes English translation).

* cited by examiner

CUTTING CUTTER FOR TIP DRESSING, AND TIP DRESSER

CROSS-REFERENCE TO RELATED APPLICATION

This is a continuation of International Application No. PCT/JP2015/005968 filed on Dec. 1, 2015. The entire disclosure of this application is incorporated herein by reference.

BACKGROUND

The present disclosure relates to a tip dressing cutter for cutting distal ends of electrode tips for spot welding and to a tip dresser having the cutter.

In general, a distal end of an electrode tip used for spot welding wears due to the welding performed a predetermined number of times, or deteriorates in its condition due to an oxide film, etc., building up thereon. Therefore, the distal end has to be periodically cut by using a tip dresser.

For example, WO 2013061710 A1 describes a tip dressing cutter including a holder which has a rotation axis extending in the vertical direction and is substantially C-shaped when viewed in plan. The holder has a cutout recess formed therein. The cutout recess opens laterally outwards and extends in the vertical direction to open both upwards and downwards. Part of the inner face of the cutout recess is formed as a mounting surface that extends in the horizontal direction. The holder has a pair of fitting surfaces as upper and lower surfaces. Each of the fitting surfaces has a diameter gradually decreasing with decreasing distance to the center section of the holder. The shape of each of the fitting surfaces corresponds to the shape of a distal end of an associated one of electrode tips when the center axes of the electrode tips coincide with the rotation axis of the holder. A cutting member can be attached to the mounting surface. The cutting member has a pair of cutting blades each corresponding to the shape of an associated one of the fitting surfaces. The holder is turned about the rotation axis thereof with the distal ends of the electrode tips each being fitted onto an associated one of the fitting surfaces, thereby cutting the distal ends of the electrode tips by the cutting blades of the cutting member.

SUMMARY

When distal ends of electrode tips are cut by the cutter as described in WO 2013061710 A1, the distal ends of the electrode tips may slide relative to the fitting surfaces in a direction crossing the center axes of the electrode tips. In such event, the center axes of the electrode tips shift with respect to the rotation axis of the holder, so that cutting operation of the cutting member becomes unstable.

In order to avoid the event, a pressure of the electrode tips applied to the fitting surfaces is raised to increase frictional resistance between the distal ends of the electrode tips and the fitting surfaces, so that the distal ends of the electrode tips are less susceptible to a slide on the fitting surfaces in the direction crossing the center axes of the electrode tips.

On the other hand, the increased frictional resistance between the distal ends of the electrode tips and the fitting surfaces may prevent the holder from rotating relative to the distal ends of the electrode tips about the rotation axis. This in turn results in inconvenience that the cutting ability of the cutter is reduced. When the pressure of the electrode tips to the fitting surfaces is increased, a load applied to a driving part that turns the holder becomes greater not only in a direction of the rotation axis, but also around the rotation axis due to the increased frictional resistance between the distal ends of the electrode tips and the fitting surfaces. This may lead to more equipment failures, thus increasing maintenance frequency.

An object of the present disclosure is therefore to provide a tip dressing cutter which has improved cutting ability and which is capable of reducing equipment failures, decreasing maintenance frequency, and enabling stabilization of cutting operation, and to provide a tip dresser having the cutter.

To achieve the object, the present disclosure is characterized by providing a plurality of grooves on a fitting surface on which a distal end of an electrode tip fits.

That is, a first aspect of the disclosure is characterized by providing a rotator having a fitting surface capable of fitting a distal end of an electrode tip for spot welding with a center axis of the electrode tip coinciding with a rotation axis of the rotator, and a cutting member attached to the rotator and having a cutting blade that extends in a direction crossing the rotation axis of the rotator, conforming to a shape of the distal end of the electrode tip fitted on the fitting surface, in which the cutting blade is configured to cut the distal end of the electrode tip when the rotator is turned with the distal end of the electrode tip being fitted on the fitting surface. In the first aspect of the disclosure, the fitting surface has a plurality of arcuate grooves formed thereon and the plurality of arcuate grooves extend around the rotation axis of the rotator as a center thereof and are consecutively formed adjacent to each other toward the rotation axis.

According to a second aspect of the disclosure, a titanium nitride coating layer is formed on the fitting surface, in the first aspect of the disclosure.

According to a third aspect of the disclosure, each of the grooves includes a bottom surface extending in a horizontal direction and a side surface extending in a vertical direction, in the first aspect of the disclosure.

A fourth aspect of the disclosure is characterized by providing a rotary drive means having a tip dressing cutter of the third aspect of the disclosure attached thereto and configured to rotate the tip dressing cutter about the rotation axis, and a cutting control means connected to the rotary drive means and configured to output an operation signal to the rotary drive means to cut by the cutting member a length L in a direction of the center axis of the electrode tip from the distal end of the electrode tip fitted on the fitting surface, in which a height H of a side surface of each groove is established to have a value greater than the length L.

In the first aspect of the disclosure, when the distal end of the electrode tip is fitted on the fitting surface, continuous portions between adjacent grooves on the fitting surface each come into contact with the distal end of the electrode tip. With the rotator rotating in such state, the continuous portions between adjacent grooves engage the distal end of the electrode tip in directions intersecting with the center axis of the electrode tip to guide the rotation of the rotator with respect to the distal end of the electrode tip. In cutting operation, the distal end of the electrode tip is therefore prevented from sliding on the fitting surface in directions crossing the center axis of the electrode tip during the rotation of the rotator, so that the rotation axis of the rotator does not shift relative to the center axis of the electrode tip. This enables avoidance of increasing numbers of equipment failures caused by raising pressure of the electrode tip against the fitting surface, and stabilization of the cutting operation of the cutting member. In addition, a contact area of the distal end of the electrode tip and the fitting surface is reduced, and a depth of biting of the cutting blade into the distal end is increased during the rotation of the rotator, resulting in higher cutting ability of the cutter to achieve efficient cutting of the distal end of the electrode tip.

In the second aspect of the disclosure, in cutting operation, the fitting surface is protected to prevent deformation of each groove, and smoothness of the fitting surface is improved. This accomplishes enhanced cutting ability of the cutter.

In the third aspect of the disclosure, the plurality of grooves have a shape that is easy to machine when formed on the fitting surface, thereby allowing the production thereof at low cost.

In the fourth aspect of the disclosure, when the cutting blade of the cutting member bites into the distal end of the electrode tip, the distal end does not come into contact with the bottom surface of the grooves until the cutting operation is completed. Therefore, this can prevent vibrations of the cutter produced by irregular contact of the electrode tip distal end with the bottom surface of the grooves in cutting operation, and thus reduction of cutting ability of the cutter can be avoided.

DETAILED DESCRIPTION

Embodiments of the present disclosure will be described in detail below based on the drawings. The following preferred embodiments are set forth merely for the purpose of examples in nature.

Figure 1:
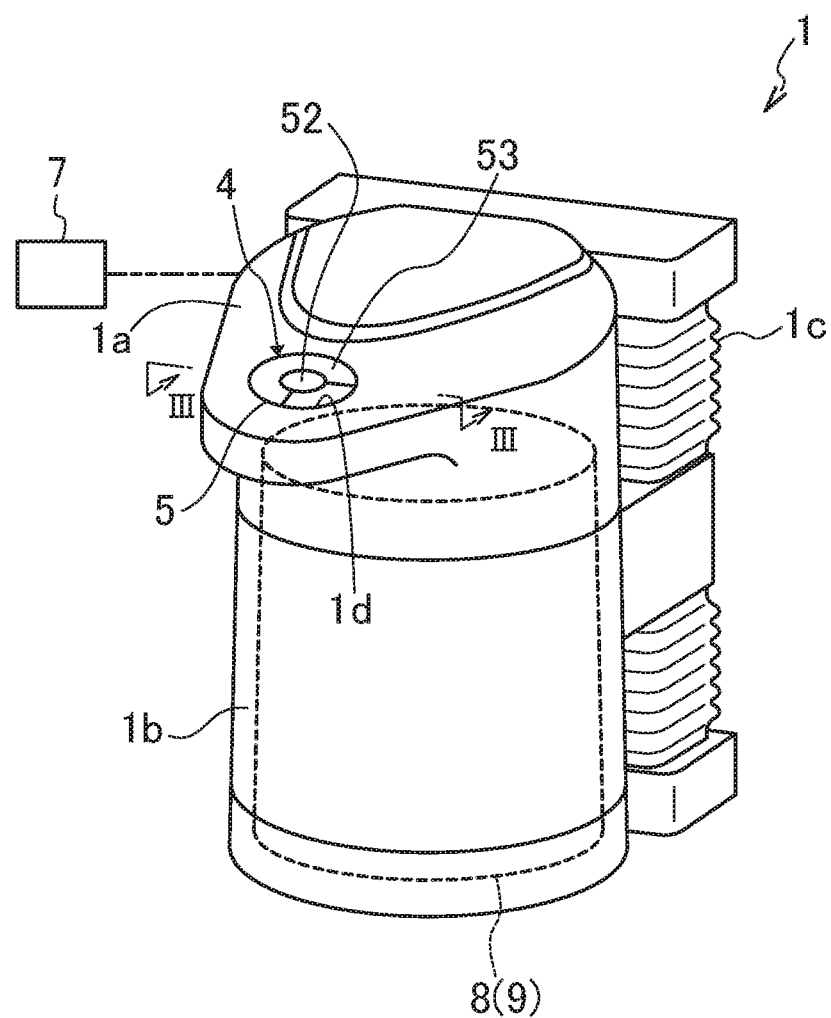
FIG. 1 is a perspective view illustrating a tip dresser according to an embodiment of the present disclosure.

FIG. 1 illustrates a tip dresser 1 according to an embodiment of the present disclosure.

The tip dresser 1 is used to cut each distal end 2a of a pair of electro tips 2 (see FIG. 3) that are inserted in shanks of a welding gun (not shown) to face each other. The tip dresser 1 has a plate-shaped casing 1a extending in the horizontal direction, a cylindrical motor casing 1b provided downwards at one side in a longitudinal direction of the plate-shaped casing 1a and having a cylinder center line oriented in the vertical direction, and a shock absorbing mechanism member 1c attached to a side of the motor casing 1b and absorbing vertical impact on the plate-shaped casing 1a and the motor casing 1b. The motor casing 1b accommodates in an interior thereof a drive motor 8, which has a rotation axis extending upwards.

Figure 3:
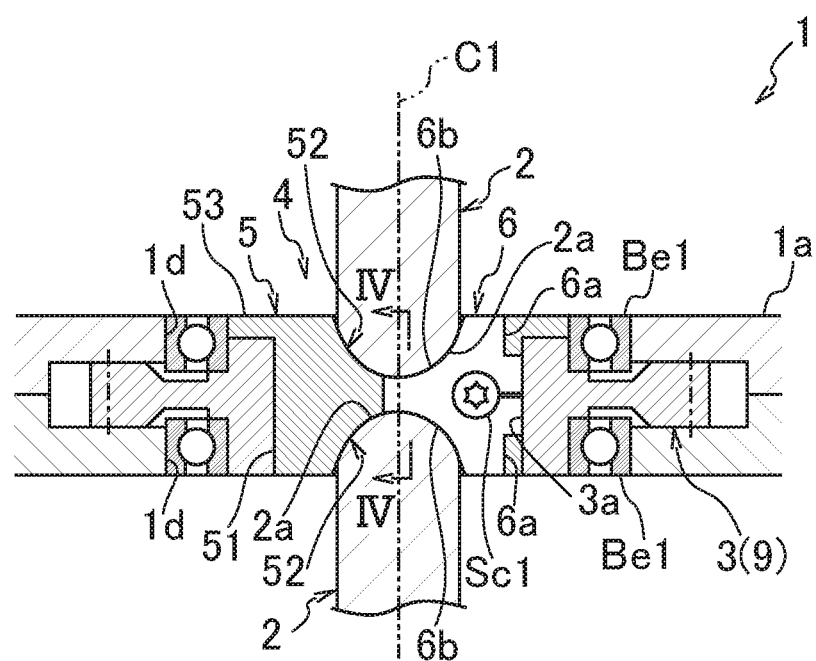
FIG. 3 is a cross-sectional view taken along the line in FIG. 1.

As shown in FIG. 3, a pair of through-holes 1d having a circular shape and facing each other are formed on top and bottom surfaces of the plate-shaped casing 1a at the other side in the longitudinal direction of the plate-shaped casing.

A ring-shaped output gear 3 is rotatably mounted between the through holes 1d and around a vertically extending rotation axis C1 via a pair of upper and lower bearings Be1 in an interior of the plate-shaped casing 1a.

The output gear 3 constitutes a rotary drive means 9 of the present disclosure together with the drive motor 8. A rotational drive of the drive motor 8 causes the output gear 3 to rotate around the rotation axis C1 via a gear meshing mechanism (not shown) provided between the drive motor 8 and the output gear 3.

A mounting hole 3a is provided at the center of the output gear 3 so as to extend therethrough vertically. A metal cutter 4 for cutting distal ends 2a of electrode tips 2 is mounted in the mounting hole 3a.

Figure 2:
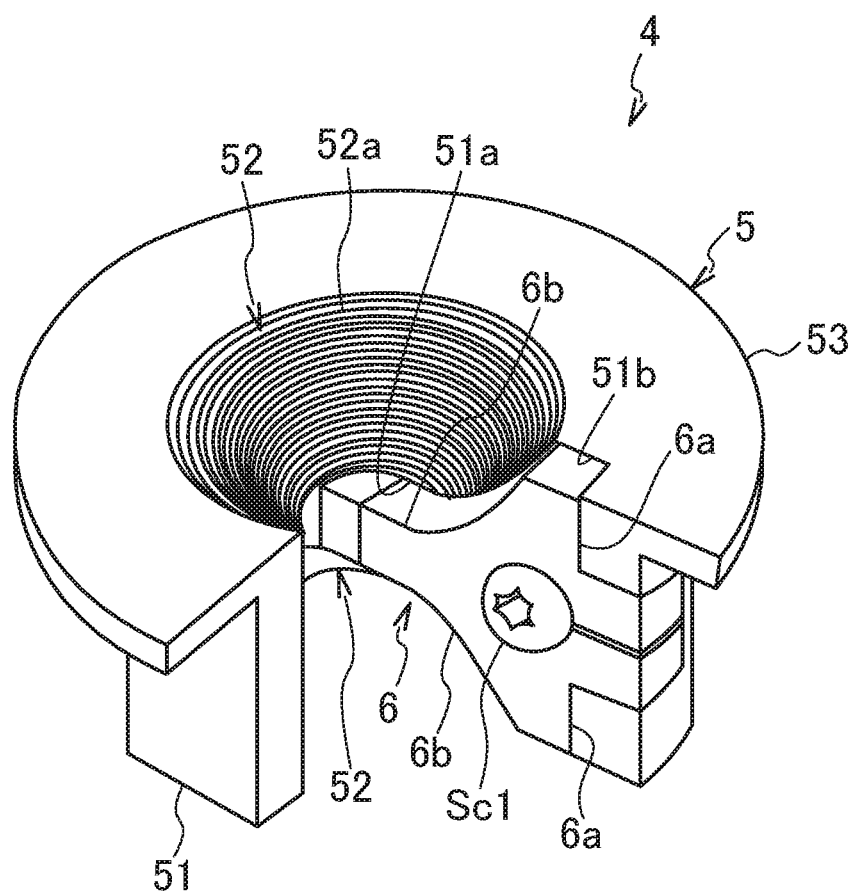
FIG. 2 is a perspective view illustrating a cutter according to an embodiment of the present disclosure.

As shown in FIG. 2, the cutter 4 includes a holder 5 being substantially T-shaped as viewed from a side and a cutting member 6 removably attached to the holder 5 and being a substantially triangular shaped plate.

The holder 5 is substantially C-shaped as viewed in plan and has a short columnar holder body 51 extending in the vertical direction. A cutout recess 51a is formed in the holder body 51. The cutout recess 51a opens laterally outwards and extends in the vertical direction to open at upper and lower ends. The cutout recess 51a is substantially sector-shaped as viewed in plan.

On top and bottom surfaces of the holder body 51, a pair of fitting surfaces 52 are formed symmetrically in a direction of the rotation axis. The fitting surface 52 has a diameter gradually decreasing toward the center section of the holder body 51.

Each of the fitting surfaces 52 is in the shape corresponding to a curved shape of the distal end 2a of the electrode tip 2 and fits the distal end 2a of the electrode tip 2 such that a center axis of the electrode tip 2 coincides with the rotation axis C1.

A plurality of arcuate grooves 52a extending around the rotation axis C1 as a center thereof are consecutively formed adjacent to each other toward the rotation axis C1, on the fitting surface 52.

Figure 4:
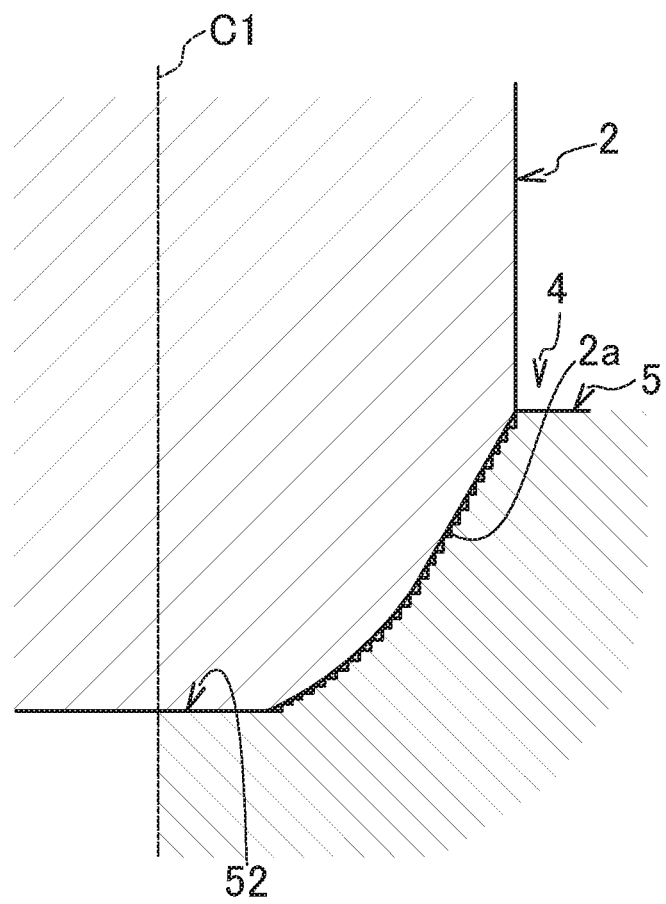
FIG. 4 is a cross-sectional view taken along the line IV-IV in FIG. 3.
Figure 5:
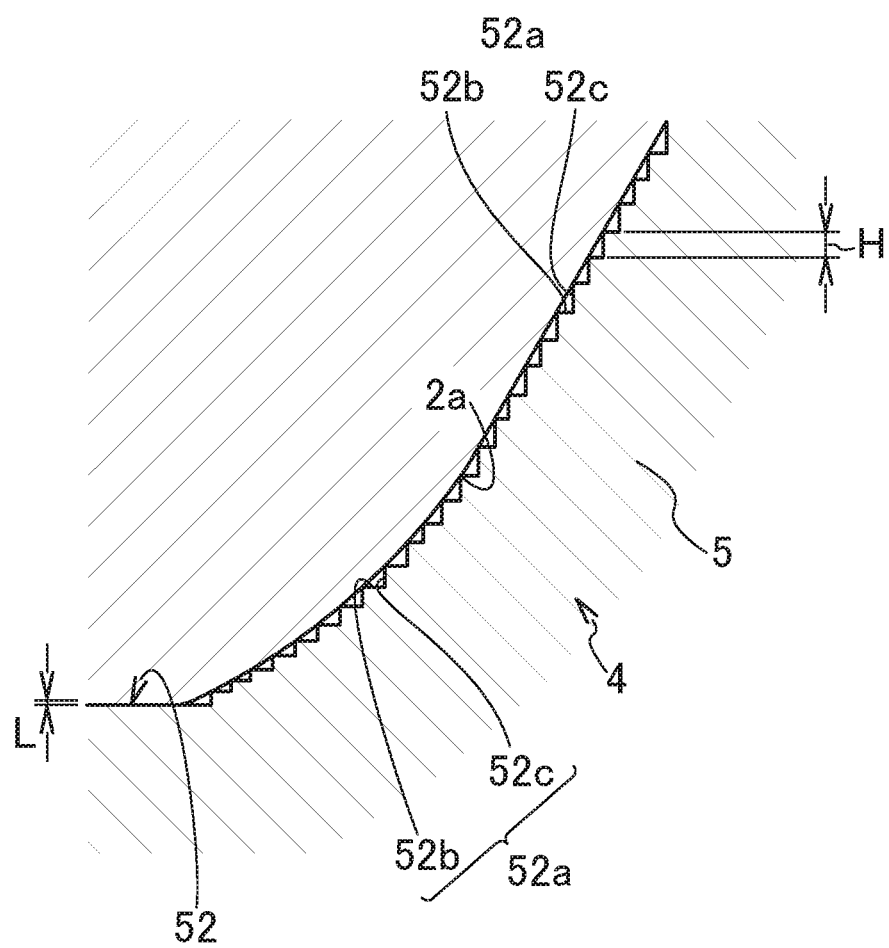
FIG. 5 is an enlarged view of a portion where a cutter and an electrode tip of FIG. 4 are contacted.

As shown in FIGS. 4 and 5, each of the grooves 52a includes a bottom surface 52b extending horizontally and a side surface 52c extending vertically. The fitting surface 52 is step-shaped due to the grooves 52a.

As shown in FIG. 5, a height H of the side surface 52c of each groove 52a is established to have a value greater than a cutting length L which will be described below.

A titanium nitride coating layer is formed on the fitting surface 52. The titanium nitride coating layer has very small thickness and thus not shown in the drawings for the sake of convenience.

A flange 53 extending outwardly from an upper peripheral edge of the holder body 51 is provided at an upper portion of the holder body 51.

A mounting step 51b recessed in a step shape is formed on an inner face of the cutout recess 51a that extends laterally outwards from the rotation axis C1.

The mounting step 51b has a shape corresponding to the cutting member 6. The cutting member 6 is attached to the mounting step 51b by means of a screw Sc1 such that a thickness direction of the cutting member 6 matches a rotating direction of the holder 5.

A pair of positioning recesses 6a cut in a rectangular shape as viewed from a side is formed in upper and lower portions of the cutting member 6 at a side distant from the rotation axis C1.

A pair of cutting blades 6b is provided in upper and lower edges of the cutting member 6 at a side close to the rotation axis C1. The cutting blades 6b have a curved shape that is streamlined with the fitting surface 52 when the cutting member 6 is attached to the mounting step 51b.

Thus, each of the cutting blades 6b extends in a direction crossing the rotation axis C1, conforming to the shape of the distal end 2a of the electrode tip 2 that fits on the fitting surface 52.

As shown in FIG. 1, a controller 7 (cutting control means) is connected to the drive motor 8 accommodated in the motor casing 1b.

The controller 7 outputs an operation signal to the drive motor 8 to rotate the output gear 3, in the state where the distal end 2a of the electrode tip 2 fits onto the fitting surface 52, whereby the cutter 4 rotates around the rotation axis C1. The cutting blade 6b cuts the cutting length L from the distal end 2a of the electrode tip 2 in a direction of the center axis of the electrode tip.

Next, operation of cutting a distal end 2a of an electrode tip 2 using the tip dresser 1 will be described.

First, a pair of electrode tips 2 each having a distal end 2a in poor condition is moved above and below the plate-shaped casing 1a of the tip dresser 1, respectively, so as to coincide the center axes of the electrode tips 2 with the rotation axis C1.

Next, the drive motor 8 of the tip dresser 1 is turned to rotate the cutter 4 around the rotation axis C1.

After that, each of the electrode tips 2 is brought closer to its corresponding fitting surface 52 of the holder 5 along the rotation axis C1 to allow the distal end 2a of each electrode tip 2 to fit on the fitting surface 52. As shown in FIGS. 3 to 5, continuous portions between adjacent grooves 52a on the fitting surface 52 then each engage the distal end 2a of the corresponding electrode tip 2 in directions intersecting with the center axis of the electrode tip to guide a rotation of the rotator relative to the distal end of the electrode tip. Each cutting blade 6b of the cutting member 6 then comes in contact with the distal end 2a of the electrode tip 2 to cut the distal end. In cutting operation, the distal end 2a of the electrode tip 2 thus does not slide on the fitting surface 52 in directions crossing the center axis of the electrode tip while the holder is rotating, so that the center axis of the electrode tip is not shifted relative to the rotation axis C1. This can ensure avoidance of increasing numbers of equipment failures caused by raising pressure of the electrode tip 2 against the fitting surface 52, and stabilization of the cutting operations of the cutting member 6.

Further, a contact area of the distal end 2a of the electrode tip 2 and the fitting surface 52 is reduced and a depth of biting of the cutting blade 6b into the distal end 2a of the electrode tip 2 is increased during the rotation of the holder 5, resulting in improved cutting ability of the cutter 4 to achieve the efficient cutting of the distal end of the electrode tip.

A titanium nitride coating layer is formed on the fitting surface 52. In cutting operation, the titanium nitride coating layer protects the fitting surface 52 to prevent each groove 52a from deforming, and improves smoothness of the fitting surface 52. This leads to further enhanced cutting ability of the cutter 4.

Each of the grooves 52a then includes the bottom surface 52b extending horizontally and the side surface 52c extending vertically and is thus easy to machine when a plurality of grooves 52a are formed on the fitting surface 52. This allows the production thereof at low cost.

In addition, as shown in FIG. 5, the height H of the side surface 52c of each groove 52a is established to be a value greater than the cutting length L. When the cutting blade 6b of the cutting member 6 bites into the distal end 2a of the electrode tip 2, the distal end of the electrode tip does not come into contact with the bottom surfaces 52b of the grooves 52a until the cutting operation is completed This can prevent vibrations of the cutter 4 produced by irregular contact of the distal end 2a of the electrode tip 2 with the bottom surfaces 52b of the grooves 52a in cutting operation, and thus reduction of cutting ability of the cutter 4 can be avoided.

Each groove 52a formed on the fitting surface 52 according to embodiments of the present disclosure includes the bottom surface 52b extending horizontally and the side surface 52c extending vertically. The bottom surface 52b and the side surface 52c, however, may extend in other directions.

The present disclosure is suitable for tip dressing cutters used to cut distal ends of electrode tips for spot welding, and for tip dressers having the cutters.

The invention claimed is:

1. A tip dressing cutter comprising:
   a rotator having a fitting surface capable of fitting a distal end of an electrode tip for spot welding with a center axis of the electrode tip coinciding with a rotation axis of the rotator;
   a cutting member attached to the rotator and having a cutting blade that extends in a direction crossing the rotation axis of the rotator, the cutting blade conforming axially to a curved shape of the distal end of the electrode tip fitted on the fitting surface, the cutting blade configured to cut the distal end of the electrode tip when the rotator is turned with the distal end of the electrode tip being fitted on the fitting surface;
   wherein the fitting surface has a diameter that decreases from a radially outer edge of the fitting surface to the rotation axis such that the fitting surface corresponds with the curved shape of the distal end of the electrode tip, and has a plurality of arcuate grooves formed thereon, the plurality of arcuate grooves extending around the rotation axis of the rotator as a center thereof and being consecutively formed adjacent to each other toward the rotation axis;
   wherein the plurality of grooves form a stair-stepped surface from the radially outer edge to a radially inner edge of the fitting surface and each groove includes a bottom surface extending in a horizontal direction and a side surface extending in a vertical direction;
   wherein a continuous portion is formed between the bottom surface of a first groove of a pair of adjacent grooves and the side surface of a second groove of the pair of adjacent grooves, the continuous portion having a right angle in cross-sectional view;
   wherein the continuous portion forms an acute angle with the distal end of the electrode tip; and
   wherein an entire region of each continuous portion is configured to come into contact with the distal end of the electrode tip that is fitted on the fitting surface.

2. The tip dressing cutter of claim 1, wherein a titanium nitride coating layer is formed on the fitting surface.

3. A tip dresser, comprising:
   a tip dressing cutter according to claim 1;
   an output gear having the tip dressing cutter attached thereto;
   a drive motor configured to rotate the output gear about the rotation axis; and
   a controller connected to the drive motor and configured to output an operation signal to the drive motor to cut by the cutting member a length L in a direction of a center axis of the electrode tip from the distal end of the electrode tip fitted on the fitting surface;

wherein a height H of the side surface of each groove is established to have a value greater than the length L.

4. A tip dresser, comprising:

a tip dressing cutter according to claim 2;

an output gear having the tip dressing cutter attached thereto;

a drive motor configured to rotate the output gear about the rotation axis; and a controller connected to the drive motor and configured to output an operation signal to the drive motor to cut by the cutting member a length L in a direction of a center axis of the electrode tip from the distal end of the electrode tip fitted on the fitting surface;

wherein a height H of the side surface of each groove is established to have a value greater than the length L.

5. The tip dressing cutter of claim 1, wherein the rotator has a mounting step having a shape corresponding to the shape of the cutting member, and wherein the cutting member is coupled to the mounting step.

6. The tip dressing cutter of claim 4, wherein the cutting member is coupled to the mounting step via a screw extending through the cutting member and into the rotator.

7. The tip dressing cutter of claim 4, wherein the cutting member comprises first and second positioning recesses configured to engage the mounting step.

\* \* \* \* \*